July 30, 1963                     C. P. GEEN                      3,099,411
                                COLLET ASSEMBLY
Filed Feb. 3, 1961                                           3 Sheets-Sheet 1
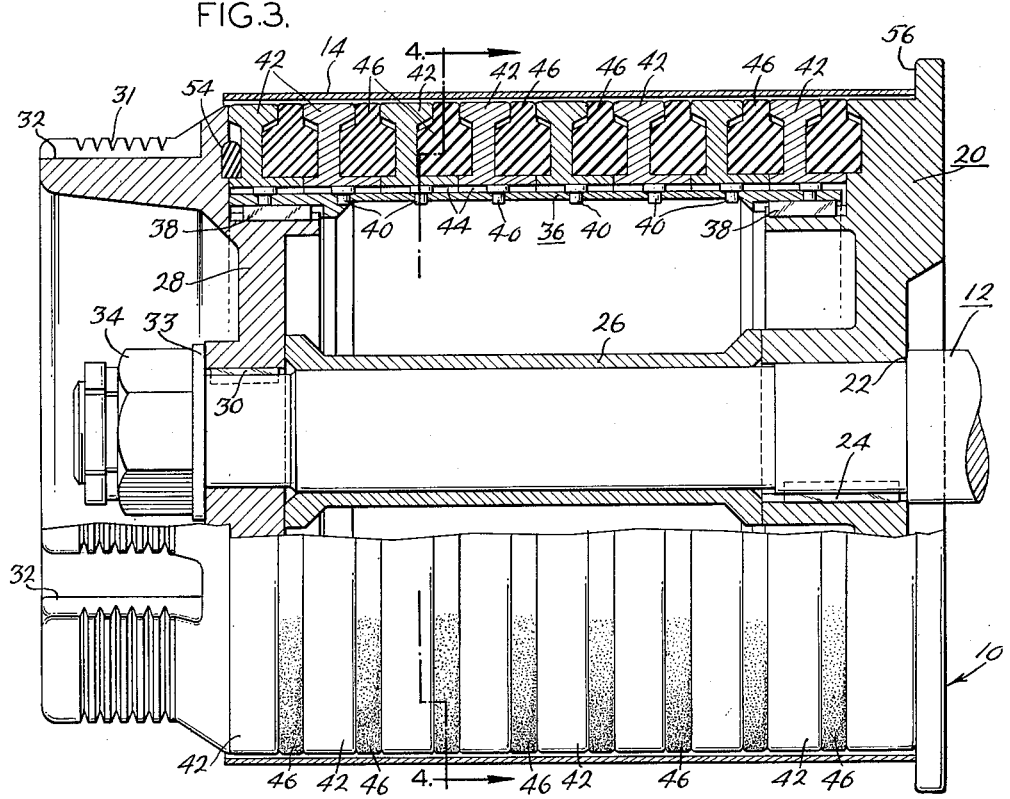
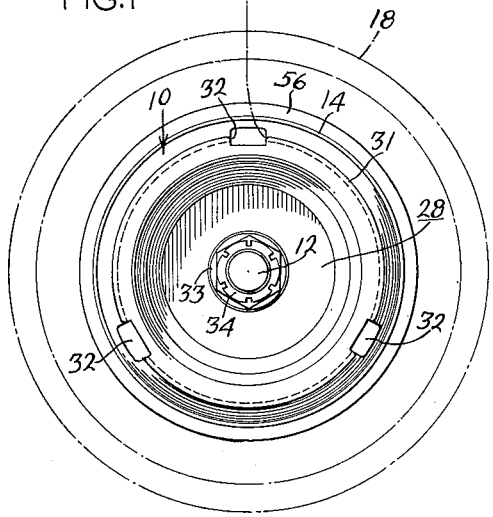
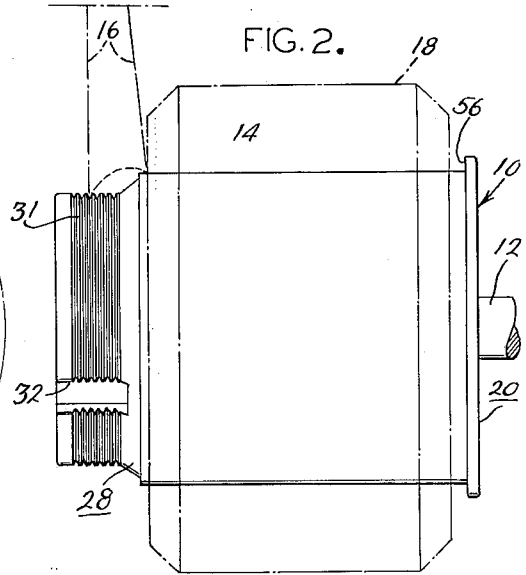
INVENTOR:
CORY P. GEEN
BY
Howson & Howson
ATTYS.

July 30, 1963 C. P. GEEN 3,099,411
COLLET ASSEMBLY
Filed Feb. 3, 1961 3 Sheets-Sheet 2
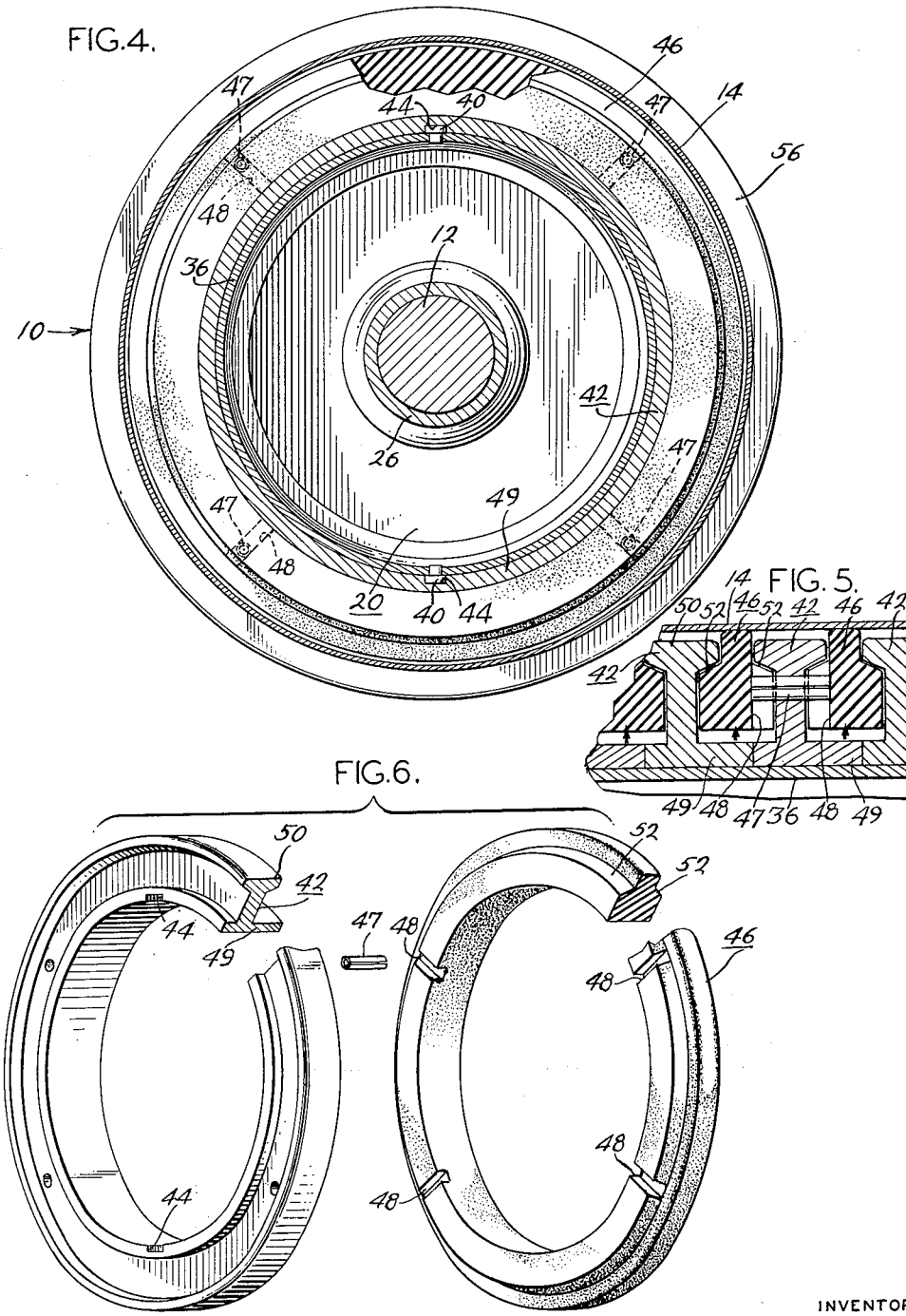
INVENTOR:
CORY P. GEEN
BY
Howson & Howson
ATTYS.

July 30, 1963  C. P. GEEN  3,099,411
COLLET ASSEMBLY
Filed Feb. 3, 1961  3 Sheets-Sheet 3

INVENTOR:
CORY P. GEEN
BY Howson & Howson
ATTYS.

United States Patent Office 3,099,411
Patented July 30, 1963

3,099,411
COLLET ASSEMBLY
Cory P. Geen, Philadelphia, Pa., assignor to Industrial Devices, Incorporated, Philadelphia, Pa., a corporation of Pennsylvania
Filed Feb. 3, 1961, Ser. No. 86,994
10 Claims. (Cl. 242—46.5)

The present invention relates generally to thread or fiber winding mechanisms and more particularly to collet assemblies for receiving and rotatably driving cylindrical tubes to wind threads or fibers thereon.

Apparatus previously developed for winding fibers on to paper tubes has proven unsatisfactory in several respects. Such apparatus has generally been of a heavy complex construction with the accompanying disadvantages of high manufacturing costs and poor acceleration characteristics. A usual type has included a spring actuated gripping mechanism for engaging the interior tube surface. Difficulty has been encountered in balancing such assemblies and additionally it has been difficult to prevent fouling of the gripping mechanism by stray fibers. Furthermore, centrifugal effects supplement the spring forces acting radially on the gripping mechanism, resulting occasionally in a bursting of the paper tube, thereby endangering the machine operator and interrupting the winding operation.

It is one object of the present invention to provide a collet assembly having a light weight structure which is thus responsive to rapid rotational acceleration.

An additional object of the invention is to provide a collet assembly of a simple design, thereby minimizing manufacturing and maintenance costs.

A further object of the invention is to provide a collet assembly which is capable of high rotational speeds.

Another object is to provide a collet assembly which upon rotation thereof automatically engages a cylindrical assembly-enveloping tube with a gentle gripping action widespread over a large area of the tube's interior surface, eliminating the dangerous possibility of bursting a tube.

A still further object of the invention is to provide a collet assembly which is self-cleaning and which cannot be clogged by loose fibers.

Still another object is to provide a collet assembly, the interior of which is sealed, preventing undesirable penetration of water, size solutions, dust or dirt into the bearing areas of the assembly.

Additional objects and advantages of the invention will be more readily apparent from the following detailed discussion of embodiments thereof when taken together with the accompanying drawings in which:

FIG. 1 is an outer end view of an embodiment of the present invention;

FIG. 2 is a side view of the embodiment shown in FIG. 1 showing the manner in which a fiber is wound upon a driven tube;

FIG. 3 is an enlarged view, partly in section, of the embodiment shown in FIG. 2;

FIG. 4 is a view taken along the lines 4—4 of FIG. 3;

FIG. 5 is a fragmentary sectional view showing the manner in which centrifugal force radially expands the drive rings into engagement with the interior tube surface;

FIG. 6 is an exploded perspective view showing a spacer, drive pin and a drive ring;

Figure 7:
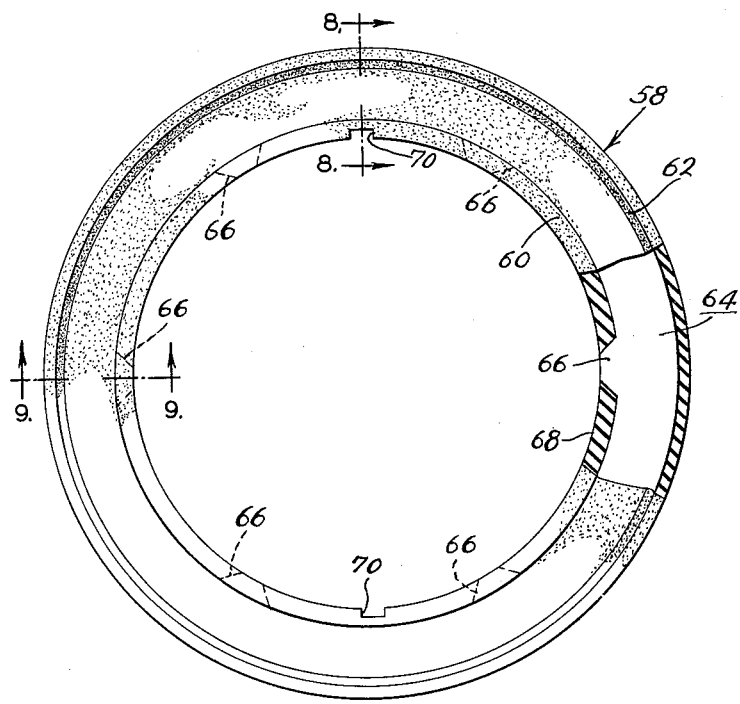
FIG. 7 is an axial view partly in section of a modified drive ring spacer.

Referring to the drawings, FIGS. 1 and 2 show a collet assembly generally designated 10 mounted on a drive spindle 12. A paper tube 14 is positioned over the collet assembly 10 and is engaged and driven thereby when the assembly is rotated by the drive spindle 12. A continuous fiber or thread 16 is wound upon the rotating tube 14 until the tube is loaded with the desired amount of fiber indicated in broken lines at 18. The tube and wound fiber are then removed from the assembly, and an empty tube is placed thereon to be wound in the same manner.

The enlarged sectional view of FIG. 3 shows the structure of the collet assembly 10 in detail. An annular inner hub 20 is coaxially positioned on the drive spindle 12 against a shoulder 22 thereof. The inner hub 20 is keyed to the spindle 12 by an inner hub key 24. A hub spacer 26 extends axially along the drive spindle 12, spacing the inner hub 20 from an outer hub 28 which is secured to the spindle 12 in rotation by an outer hub key 30. A grooved cylindrical projection 31 extends axially outwardly from the periphery of the outer hub 28, the grooved portion having spaced axially aligned slots 32 thereon. A washer 33 and lock nut 34 on the spindle 12 secure the inner and outer hubs and spacer axially on the spindle against the drive spindle shoulder 22.

A cylindrical collet tube 36 extends between the inner hub 20 and the outer hub 28 and is keyed to the hubs by keys 38. Two rows of collet tube lock pins 40 are press fitted into the collet tube 36, the rows being diametrically opposed as shown in FIG. 4.

Annular drive ring spacers 42 are mounted on the collet tube 36, slots 44, FIG. 6, in the spacers coacting with the lock pins 40 to circumferentially secure the spacers to the collet tube. Rubber drive rings 46 are positioned between the drive ring spacers 42. Drive pins 47 shown in FIGS. 4, 5 and 6 extending from alternate spacers and coacting with slots 48 in the drive rings prevent rotational slippage of the drive rings, while permitting radial expansion thereof.

As seen in the exploded view of FIG. 6 a drive ring spacer 42 includes an inner flange 49 extending axially from each side of the spacer and an outer flange 50 likewise extending axially forming the peripheral surface of the spacer. Aluminum forgings have been used for drive ring spacers with excellent results.

The shape of the drive rings 46 is also shown in FIG. 6 and is essentially a resilient ring having annular shoulder portions 52 provided on each side thereof. The drive rings may be made from synthetic rubber molded into the required shape, no machining being necessary, or other suitable substances.

Assembly of the invention is accomplished by first mounting the inner hub 20 and hub spacer 26 on the drive spindle 12, positioning the collet tube 36 over the inner hub 20, alternately applying the drive rings 46 and drive ring spacers 42 over the collet tube, and finally securing the assembly by positioning the outer hub against the spacer and tightening the lock nut 34. A resilient O ring 54, in compression between the outer hub 28 and the outer drive ring spacer, effectively seals the unit from harmful foreign particles.

In operation the assembly 10 is mounted as described on a drive spindle 12 which is connected with a selectively operable drive means permitting intermittent rotation and operation of the collet assembly. Although a horizontal position is preferred, the assembly may be mounted and operated in either a horizontal or vertical position. With the spindle and assembly at rest, a paper tube 14 of a diameter slightly exceeding that of the drive rings 46 and drive ring spacers 42 is slid into a position over the cylindrical surface formed by the outer peripheries of the drive ring spacers and the drive rings abutting the inner hub flange 56, as shown in FIGS. 2 and 3.

As the assembly and paper tube are brought up to the desired operating speed, the rubber drive rings 46 are radially expanded by centrifugal force. As shown in FIG. 5, this radial expansion of the drive rings, schematically indicated by the arrows therebelow, brings the rings into a gripping contact with the inner surface of the paper tube 14, thereby rotating the tube with the collet assembly. The paper tubes, which from handling, packaging or storing, are frequently in a bent non-cylindrical condition, are rounded out and centered on the collet by the expanding drive rings.

A fiber strand 16 is started in the usual manner by winding several turns of "coarse yarn" on the grooved projection 31 of the outer hub 28, as shown in FIGS. 1 and 2. The strand is then picked up by a builder mechanism which provides the desired distriubution thereof on the tube. The assembly is designed to be operated at speeds within a wide range and the light weight structure of the assembly permits acceleration to these speeds within a very short time.

When the winding of the fiber is completed the assembly is braked to a halt and the fiber 16 is cut and in the usual installation is lead to an adjoining assembly for continued winding thereon. A hooked knife is inserted in the slots 32 of the grooved projection 31 and by manipulation of the knife the "coarse yarn" wound on the grooved projection is cut away and discarded, permitting removal of the loaded paper tube and insertion of a fresh tube in preparation for the next winding cycle.

The manner in which the drive rings move radially in expansion during acceleration of the assembly necessitates an appropriate clearance between the drive rings 46 and the drive ring spacers 42 to insure free radial movement of the drive rings as shown in FIG. 5. The shoulder portions 52 of the drive rings 46 are not intended to contact the outer flange 50 of the drive ring spacers 42 during normal winding operation but serve to limit expansion and prevent breakage and disengagement of the drive rings from the collet should the assembly be rotated without a tube.

Modified embodiments of the assembly have been developed for lower speed collets using substantially nonmetallic drive ring spacers. Synthetic materials such as a resilient urethane polymer are used for the drive ring spacers in the modified embodiments and are accurately molded under high pressures to the finished dimensions required. Machining is unnecessary, resulting in a considerable cost reduction over the use of machined metal spacers.

Figure 8:
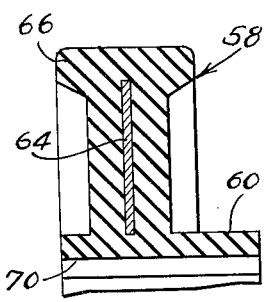
FIG. 8 is a view taken along line 8—8 of FIG. 7.
Figure 9:
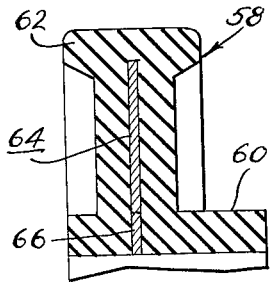
FIG. 9 is a view taken along line 9—9 of FIG. 7.

A first modified embodiment is shown in FIGS. 7, 8 and 9 and is directed to the use in drive ring spacers of synthetics which may tend to expand with the drive rings when subjected to the strong centrifugal forces. To combat such a tendency to expand, a flat metal washer is centrally molded within the synthetic spacers. FIG. 7 shows a synthetic spacer 58 having an inner flange 60 and an outer flange 62. A flat washer 64 is centrally molded within the spacer as shown in FIGS. 7 and 8.

In order to coaxially position the flat washer 64 within the spacer 58 during the molding operation, lugs 66 are spaced around the inner diameter of the washer extending to the inner surface 68 of the spacer 58 as shown in FIGS. 7 and 9, thereby coacting with the mold during the molding process and coaxially positioning the washer with respect to the spacer. The washer 64 should be of a material to which the synthetic spacer will strongly bond following exposure thereto in the molten state. For example, urethane polymer bonds to copper plated steel, brass, copper or bronze with an extremely tenacious bond and thus the use of such material in the washer with such a synthetic would successfully prevent the spacer from expanding with the drive rings due to centrifugal force. Slots 70 are cut into the synthetic spacer 58 to coact with the collet tube lock pins 40, as shown in FIG. 7.

Figure 10:
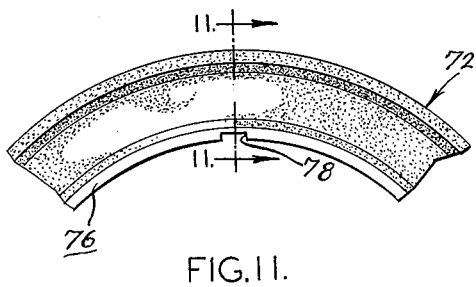
FIG. 10 is a fragmentary axial view of a further modified drive ring spacer.
Figure 11:
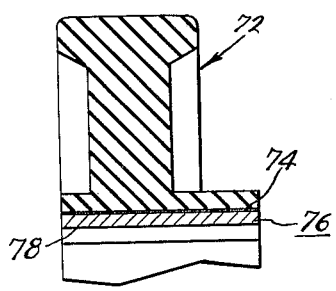
FIG. 11 is a view taken along line 11—11 of FIG. 10.

A further modified embodiment is shown in FIGS. 10 and 11 and consists of a spacer 72 solidly molded of a synthetic material which is bonded by a suitable bonding material 74 to a metal sleeve 76. This embodiment is suitable only with synthetic spacer materials which are relatively non-expansible when placed under conditions of high centrifugal force. Urethane polymers, for example, can be molded to satisfy this requirement. In this embodiment slots 78 are cut in the metal sleeve 76 to coact with the collet tube lock pins 40.

The use of synthetic materials both for the drive rings and the drive ring spacers results in a light weight assembly with a low rotational inertia, allowing rapid acceleration and an appreciable saving of time during the cyclical winding operation. The use of molded drive rings and spacers also results in considerable savings in manufacturing costs.

The only part of the collet assembly which is in radial motion during operation of the assembly is the drive rings which expand radially due to centrifugal force. Since the drive rings are accurately molded insuring a uniform cross-section thereof, the assembly retains its initial balance at all times in spite of the high rotational speed. The drive rings expand uniformly and thus do not produce an imbalance of the assembly during rotation thereof.

The structure of the present invention provides a self-cleaning action, which is of particular importance in the winding of glass fibers, which have a tendency to adhere to and clog winding machinery. This self-cleaning action is effected by the radial expansion of the drive rings between the spacers which clears the collet of stray fibers upon acceleration thereof.

It should be understood that reference made to the fiber or thread 16 is intended to include a broad range of materials suitable for winding, such as multi-filament glass strands, carpeting yarns and the like. Reference to a "fiber" is by way of illustration only and not as a limitation.

The invention is adaptable to manufacture in any desired size to suit the material wound thereon, the condition attending the winding process, and the requirements of the user.

Manifestly, minor changes in details of construction can be effected by those skilled in the art without departing from the spirit and the scope of the invention as defined in and limited solely by the apended claims.

I claim:

1. A collet assembly for winding thread or fiber upon cylindrical tubes and adapted for use with a selectively rotatable drive spindle comprising annular radially expansible drive rings, annular drive ring spacers positioned between said drive rings, mounting means for positioning said drive rings and drive ring spacers on the spindle, said drive rings and spacers collectively providing a cylindrical surface adapted to receive a cylindrical tube, said drive rings and spacers being substantially axially co-extensive with a cylindrical tube upon positioning of a tube over said rings and spacers, rotation of the spindle centrifugally expanding said drive rings thereby gripping and rotating the tube and effecting and maintaining a true cylindrical tube shape, thus permitting a uniform winding of thread or fiber thereon.

2. A collet assembly for winding thread or fiber upon cylindrical tubes and adapted for use with a selectively rotatable drive spindle comprising spaced inner and outer annular hub members mounted on and keyed to the spindle, a cylindrical collet tube positioned between said hub members, annular drive ring spacers mounted on said collet tube, and resilient radially expansible annular drive rings positioned between said spacers, said drive rings and spacers providing a cylindrical surface adapted to receive a cylindrical tube, said drive rings and spacers being substantially axially co-extensive with a cylindrical tube upon positioning of a tube over said rings and spacers, rotation of the spindle centrifugally expanding said drive rings thereby frictionally gripping and rotating the tube and effecting and maintaining a true cylindrical tube shape, thus permitting a uniform winding of thread or fiber thereon.

3. A collet assembly as claimed in claim 2, drive pins extending from said drive ring spacers coacting with slots in said drive rings thereby preventing rotational slippage of said drive rings with respect to said drive ring spacers while permitting radial expansion thereof.

4. A collet assembly as claimed in claim 3, flanges on said drive ring spacers, and shoulders on said drive rings coacting with said flanges thereby limiting the radial expansion of said drive rings to prevent disengagement of the rings from the assembly.

5. A collet assembly as claimed in claim 4, said outer hub member having a grooved cylindrical projection for starting the winding of a thread or fiber.

6. A collet assembly as claimed in claim 5, said drive ring spacers being molded of a synthetic material and having an annular metal insert encased therein to prevent radial expansion thereof.

7. A collet assembly as claimed in claim 5, said drive ring spacers being molded of a synthetic material bonded to a central metal sleeve.

8. A collet assembly for winding thread or fiber upon cylindrical tubes and adapted for use with a selectively rotatable drive spindle comprising spaced inner and outer annular hub members secured to the spindle, a hollow cylindrical collet tube positioned between said hub members and concentrically disposed over the spindle, annular drive ring spacers secured on said collet tube projecting radially therefrom, and resilient radially expansible annular drive rings positioned between said spacers, said drive rings and spacers providing a cylindrical surface adapted to receive a cylindrical tube, said drive rings and spacers being substantially axially co-extensive with a cylindrical tube upon positioning of a tube over said rings and spacers, rotation of the spindle centrifugally expanding said drive rings thereby frictionally gripping and rotating the tube and effecting and maintaining a true cylindrical tube shape, thus permitting a uniform winding of thread or fiber thereon.

9. A collet assembly as claimed in claim 8, including flanges on said drive ring spacers, and shoulders on said drive rings, said shoulders coacting with said flanges thereby limiting the radial expansion of said drive rings to prevent disengagement of the rings from the assembly.

10. Thread or fiber winding apparatus comprising a selectively rotatable drive spindle, radially expansible annular drive rings, annular drive ring spacers, mounting means for maintaining said drive rings and spacers in alternate juxtaposed relation on said drive spindle, a deformable cylindrical winding tube overlying said drive rings and spacers, said drive rings and spacers providing a cylindrical surface adapted to receive said tube, said drive rings and spacers being axially co-extensive with said cylindrical winding tube, rotation of said drive spindle centrifugally expanding said drive rings thereby frictionally gripping and rotating said tube and effecting and maintaining a true cylindrical tube shape over the axial extent of the tube, thus permitting a uniform winding of thread or fiber thereon.

References Cited in the file of this patent

UNITED STATES PATENTS

| | | |
|---|---|---|
| 2,668,020 | Dunlap | Feb. 2, 1954 |
| 2,887,278 | Bauer | May 19, 1959 |
| 2,891,798 | Smith | June 23, 1959 |

FOREIGN PATENTS

| | | |
|---|---|---|
| 344,253 | Great Britain | Mar. 5, 1931 |